though they break down to some extent under the

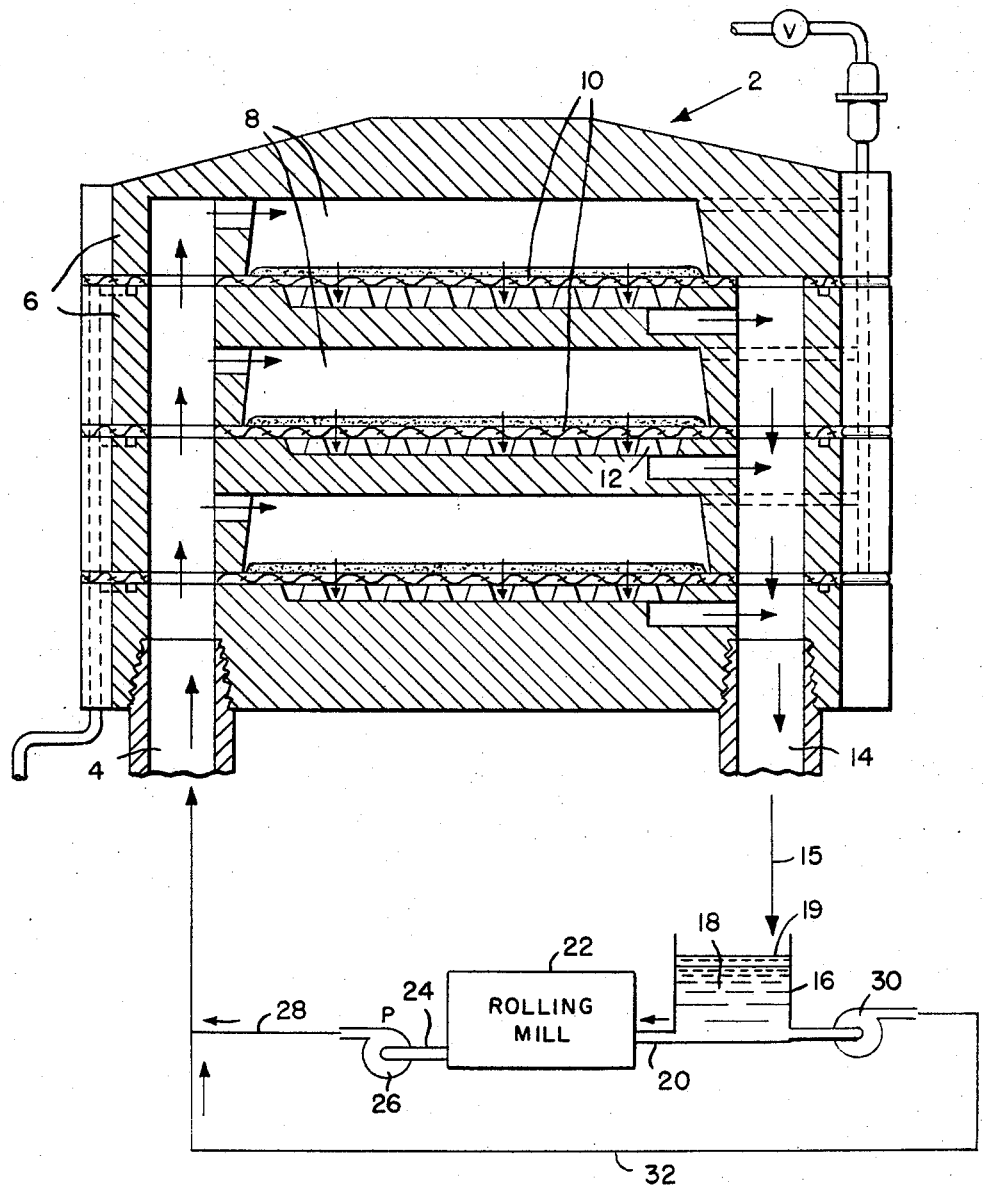

United States Patent Office 3,478,874
Patented Nov. 18, 1969

3,478,874
METHOD FOR SEPARATION OF TRAMP OIL FROM OIL-IN-WATER EMULSIONS
John O. McLean, Varina, Va., and John R. Schneider, Belvedere, Calif., assignors to De Laval Turbine Inc., Trenton, N.J., a corporation of Delaware
Filed Mar. 3, 1965, Ser. No. 436,791
Int. Cl. B01d 13/00
U.S. Cl. 210—23
4 Claims

ABSTRACT OF THE DISCLOSURE

A method for the separation of nonemulsified suspended oil droplets from an emulsion of an oil as the disperse phase in an aqueous continuous phase, without degradation of the emulsion. The emulsion containing the nonemulsized droplets is passed through a separating medium providing numerous flow passages. The flow passages in the separating medium are of a short length in the direction of flow so that oil after accumulation in the passages flows therefrom in the form of droplets of a size larger than those in the original liquid. The method then involves effecting, in the effluent from the separating medium, gravity flotation of the larger droplets.

---

This invention relates to a method for separation of tramp oil from oil-in-water emulsions.

In the rolling of sheet metal, cooling and lubricating liquids are used which are emulsions of oil as the disperse phase in water as the continuous phase, there being present suitable emulsifiers. Such an emulsion is generally referred to as a soluble oil, and may typically consist of about 5% of a lubricating oil dispersed in water carrying an emulsifier such as a rosin soap, a petroleum sulfonate, polyethylene oxide derivatives, or the like. Such soluble oils may vary widely in their oil content; the oil may be of many types depending on the results desired (the oil being usually a petroleum oil) and many varieties of emulsifiers may be used. Typically in such a soluble oil the droplets of the dispersed oil range downwardly from about 5 microns in diameter. The dispersions are quite stable though they break down to some extent under the conditions of use.

Considering the use of such a soluble oil in the rolling of aluminum, it becomes contaminated in several ways. First, it is contaminated with oil from hydraulic controls and bearings in the rolling mill. It is further contaminated by oil which separates from the emulsion by reason of its degradation. Oil from these sources becomes suspended in the emulsion without becoming actually emulsified: i.e. droplets of this oil appear in the emulsion ranging in size generally upwards of twenty microns in diameter. In the art, the oil forming these droplets is known as tramp oil. The rather fine dispersion of these droplets is due to the violent agitation which occurs during the rolling operation. The tramp oil droplets will gradually separate and float to the surface of the emulsion if it is held sufficiently long in a detention tank. However, due to the small size of the tramp oil droplets, the removal of the tramp oil by this gradual separation is not desirable because of the long periods of detention required, involving, necessarily, the provision for use in the mill of unduly large quantities of the soluble oil.

There is a second concurrent contamination of the soluble oil due to the accumulation of solids. In the case of the rolling of aluminum, the contaminating solids are largely aluminum and aluminum oxide. These result from the fact that in the rolling operation portions of the surface of the aluminum are removed from the strips or sheets being rolled. Another solid which contaminates the soluble oil is carbon in the form of particles produced by the decomposition of oil at the high temperatures of rolling, for example around 950° F. The carbon particles are particularly undesirable because they may be pressed into the final aluminum sheet. Silica and mill dust also contaminate the soluble oil. Bacteria are also often present.

The solid particles which appear in accordance with the foregoing are generally less than ten microns in nominal diameter. Microscopic examination reveals that these solid particles accumulate in the droplets of the tramp oil, with little or none entering the actually emulsified droplets of smaller size in the emulsion.

The general object of the present invention may be stated to be the removal of contaminants from an emulsion of the type referred to without degradation of the emulsion. Specifically, this is achieved by passing the contaminated oil through a filtering medium. When this is done, it is found that the original very small droplets of tramp oil coalesce in passing through the filter medium to produce large droplets which readily and rapidly separate from the emulsion, floating to the surface from which they may be skimmed off. From this mere standpoint of separation, the invention makes unnecessary the provision of a large detention tank in which average detention time is such as to permit the very slow separation of the original droplets. A tank may be used which is merely of a volume required to hold the soluble oil to take care of the varying demands by the rolling mill.

But a second and an unusual matter also occurs: it is found that the solid particles contaminating the soluble oil and which have sizes ranging downwardly from about ten microns are so retained in the tramp oil that they pass therewith through the filter medium and remain therein so that they separate with the tramp oil. The advantage of this is that the filter medium need not be designed to hold back the solid particles by virtue of a minute pore size. Since they pass through the filter medium, they do not contribute to the formation of a filter cake, and such a cake builds up only very slowly due to much smaller amounts of relatively large particles, primarily dirt which may have entered the soluble oil but which does not have its origin in the same way as the aluminum, aluminum oxide, or carbon particles referred to above. In other words, while the filter medium may ultimately accumulate such a cake as would necessitate its replacement, its useful life is much prolonged even though major amounts of solid particles are removed in the process, with the tramp oil. Accordingly, the filter may operate for long periods of time without shutdown for cleaning. The necessity for cleaning is even further minimized if the filter mentioned is preceded by a coarse filter to remove large dirt particles which would otherwise form a filter cake in the coalescing filter.

Operation in accordance with the foregoing takes place without appreciable degradation of the emulsion itself, the droplets in which, and which form the disperse phase of the emulsion, not being coalesced, so that to a major extent the emulsion passes through intact though cleaned.

Further objects of the invention relating to aspects of operation will become apparent from the following description, read in conjunction with the accompanying drawing, in which the figure shows diagrammatically a typical system involving the invention, a suitable type of filter being indicated in fragmentary section.

The filter, generally designated as 2, may be substantially any form of filter press utilizing fabric filter media, but it is specifically illustrated as of the type disclosed in Schneider application Ser. No. 375,049, filed June 15, 1964, now abandoned. Such a filter comprises an inlet pipe 4 communicating with distributing openings in separable plates 6 which contain inlet chambers 8, bounded by sheets 10 of filter fabric which are clamped between the sections 6 when the filter press is closed. Filtrate flows into passages defined by ribs, or the like, 12 and then to aligned opening in the filter press sections which communicate with an outlet pipe 14.

The outlet pipe 14 is illustrated as continued by a conduit 15 which discharges cleaned emulsion into a tank 16 which is of a size suitable to take care of variations in demand by a rolling mill. Because of rapid separation of the tramp oil in this tank, the tank need not be of a size to provide special and long detention time.

The recovered emulsion is indicated at 18, and floating thereon there is indicated at 19 a layer of tramp oil which may be skimmed off from time to time.

Makeup emulsion may be introduced into tank 16.

The connection 20 provides for the passage of the soluble oil to a rolling mill 22 which need not be detailed since it is completely conventional, involving the provisions for applying the emulsion to the metal being rolled. The contaminated emulsion from the rolling mill exits through the passage 24 from which a pump 26 delivers it through the connection indicated at 28 to the inlet pipe 4 of the filter.

Typical operation of a rolling mill involves intermittent demand for soluble oil, whereas it is desirable to operate the coalescing filter continuously. Accordingly it is preferred to recirculate oil from tank 16 to the filter, bypassing the rolling mill, by means of a pump 30 and connection 32. If desired a separate small tank may receive the flow from the filter and from this the oil may be recirculated by pump 30, the oil, as demanded by the mill, passing from this auxiliary small tank to the mill tank 16. Obviously many variations of the flow system may be adopted.

The filter medium used may vary through a wide range, desirably having sufficient porosity to provide free flow of the contaminated emulsion and to pass, particularly, the fine solid particles which are trapped in the tramp oil. Unless preceded by another filter to remove large solid particles, its porosity should be such as to trap such particles which will gradually build up to form a cake necessitating opening of the filter to permit removal of the filter sheets and their replacement. The filter medium is not at all critical in its properties so far as the function of coalescence of the tramp oil is involved. The drawing illustrates a built-up filter cake such as might accumulate after a long period due to stopping of large dirt particles and would necessitate change of the filtering medium; but this cake will not contain the fine solid particles entrapped in the tramp oil and which will pass through the filter.

As an example of an optimum filter medium which may be used in accordance with the invention there may be referred to the "Viskon" non-woven filter fabric designated as style S-1250, manufactured by T. M. Chicopee Manufacturing Corporation. This fabric comprises cotton fibers bound by a cellulose binder. The particular fabric has a weight of 2.85 ounces per square yard, has an air porosity of 70 cubic feet per minute per square foot as measured on a standard Frazier Air Porosimeter under a pressure drop of ½ inch of water, and a water flow figure of 315 gallons per minute per square foot as measured on standard equipment at a head of 24 inches of water.

Using the circulatory system shown in the drawings and which has been described, as the contaminated soluble oil (emulsion) flows through the filter coalescence of the tramp oil takes place while it and its contained fine solids pass through the filter medium. Since the liquid flow passages provided by the filter medium are of short length in the direction of flow, the tramp oil after accumulation therein, is extruded therefrom in the form of droplets considerably exceeding in size those in the original liquid. The coalescence is into sufficiently large droplets that they separate by flotation almost immediately in the tank 16 or in an auxiliary tank as described above. The fine solids are trapped in the tramp oil and the tramp oil layer at 19 may be skimmed off from time to time as it accumulates. The emulsion 18 is then returned for use in the rolling mill.

If completely continuous operation is desired, a pair of filters may be used so that one may be substituted for the other when the latter is opened for cleaning and replacement of the filter sheets.

It will be evident that various changes may be made in details of the method without departing from the invention as defined in the following claims.

What is claimed is:

1. The method, for the separation of nonemulsified suspended oil droplets from an emulsion of an oil as the dispersed phase in an aqueous continuous phase without degradation of the emulsion, comprising passing such emulsion containing the nonemulsified droplets through a separating medium providing numerous liquid flow passages therethrough, said passages being of short length in the direction of flow so that oil after accumulation therein is extruded therefrom in the form of droplets considerably exceeding in size those nonemulsified in the original liquid, and then effecting in the effluent from said medium gravity flotation of said larger droplets.

2. The method, for the separation of nonemulsified suspended oil droplets from an emulsion of an oil as the dispersed phase in an aqueous continuous phase without degradation of the emulsion, comprising passing such emulsion containing the nonemulsified droplets through a fabric separating medium providing numerous liquid flow passages therethrough, said passages being of short length in the direction of flow so that oil after accumulation therein is extruded therefrom in the form of droplets considerably exceeding in size those nonemulsified in the original liquid, and then effecting in the effluent from said medium gravity flotation of said larger droplets.

3. The method, for the separation, from a mixture, of nonemulsified oil droplets and fine solid particles from an aqueous liquid in which they are suspended, comprising passing such mixture containing the nonemulsified droplets and said solid particles through a separating medium providing numerous liquid flow passages therethrough, said passages being of short length in the direction of flow and being of a size to pass freely said solid particles so that oil after accumulation therein is extruded therefrom in the form of droplets entrapping said solid particles and considerably exceeding in size those nonemulsified but suspended in the original mixture, and then effecting in the effluent from said medium gravity flotation of said larger droplets containing the solid particles.

4. The method, for the separation, from a mixture, of nonemulsified oil droplets and fine solid particles from an aqueous liquid in which they are suspended, comprising passing such mixture containing the nonemulsified droplets and said solid particles through a fabric separating medium providing numerous liquid flow passages therethrough, said passages being of short length in the direction of flow and being of a size to pass freely said solid particles so that oil after accumulation therein is extruded therefrom in the form of droplets entrapping said solid particles and considerably exceeding in size those nonemulsified but suspended in the original mixture, and then effecting in the effluent from said medium gravity flotation of said larger droplets containing the solid particles.

References Cited

UNITED STATES PATENTS

| 1,658,362 | 2/1928 | Walker | 210—73 |
| 1,947,709 | 2/1934 | Garrison. | |
| 2,522,378 | 9/1950 | Kirkbride | 210—500 |
| 2,551,175 | 5/1951 | Smith. | |
| 2,588,794 | 3/1952 | Barton | 210—83 X |
| 2,611,490 | 9/1952 | Robinson | 210—321 X |
| 2,746,607 | 5/1956 | Hess | 210—314 X |
| 3,256,997 | 6/1966 | Pall. | |
| 3,265,212 | 8/1966 | Bonsall | 210—73 |

MORRIS O. WOLK, Primary Examiner

S. MARANTZ, Assistant Examiner

U.S. Cl. X.R.

210—73, 83, 314, 500; 252—360